Feb. 2, 1960     C. G. CASTBERG     2,923,632
METHODS AND DEVICES FOR PREVENTING STALK ROT IN FRUIT STALKS
Filed Oct. 23, 1956
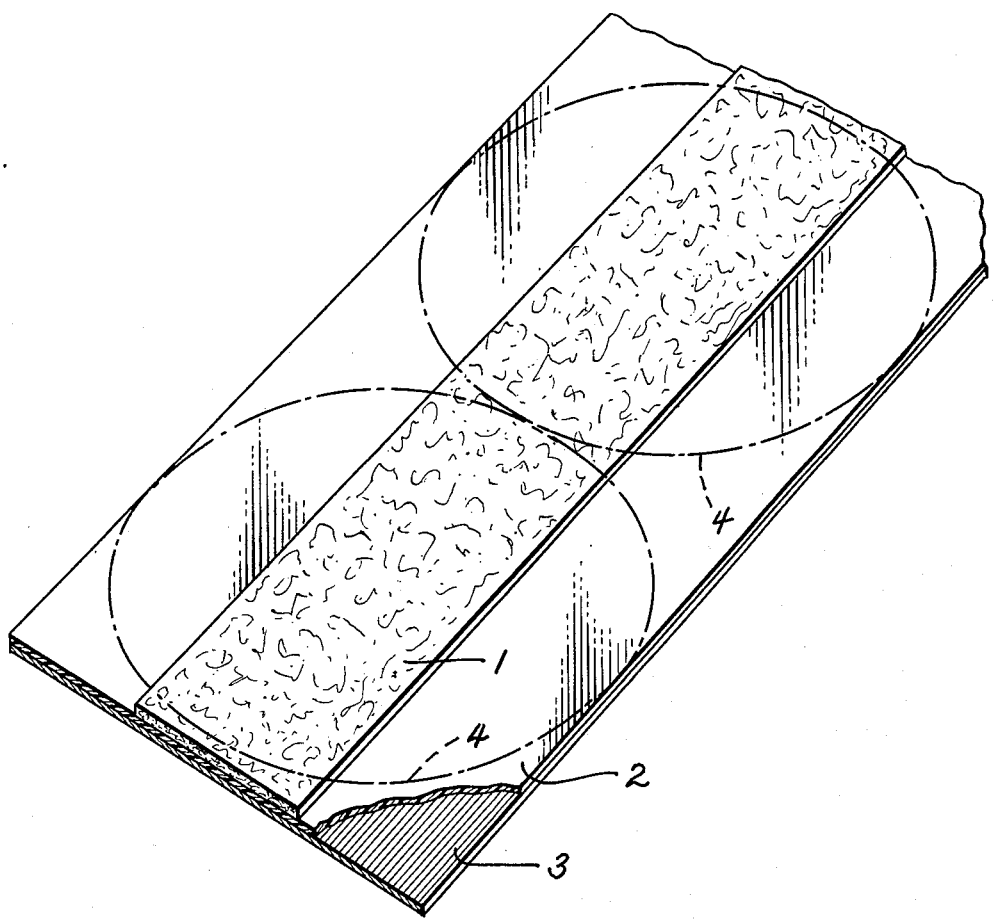
Carl Gustav Castberg
INVENTOR
BY
Henry W. Koster
HIS ATTORNEY

United States Patent Office 2,923,632
Patented Feb. 2, 1960

2,923,632

METHODS AND DEVICES FOR PREVENTING STALK ROT IN FRUIT STALKS

Carl Gustav Castberg, Nynashamn, Sweden, assignor to Rederiaktiebolaget Nordstjernan, Nynashamn, Sweden, a corporation of Sweden Application October 23, 1956, Serial No. 617,786

Claims priority, application Sweden October 25, 1955

4 Claims. (Cl. 99—154)

The present invention relates to treatment of fruit stalks, such as e.g. banana bunches, in order to prevent stalk rot.

It is a well-known fact that stalk rot in banana bunches is one of the most serious problems in prolonged storage and/or transport of bananas. The rot is caused by a mold fungus, which enters the main stalk of the banana bunch through the section or wound surfaces formed when the bunch is cut from the plant as also when the top end is cut off. The rot penetrates through the main stalk of the bunch, reaches the banana "hands" and proceeds into the bananas, spoiling them.

Prior art methods of combatting stalk rot have involved rapid cooling of the banana bunch as soon as possible after cutting to retard the growth of the fungus or protecting and disinfecting the wound surfaces by applying lime, pure vaseline, vaseline containing additives of fungicidal chemicals, or quickly drying "paint" having fungicidal chemicals added thereto. The last-mentioned method employing a disinfecting paint is currently the most commonly used, but it is lacking in effectiveness both as regards the disinfecting action and the practical difficulty of getting the "paint" to cover the wound surfaces completely, so that the chemicals obtain contact with all fungi present.

The present invention has for its object to provide a method of preventing stalk rot in banana stalks and other fruit stalks by a treatment which is effective, reliable and simple to carry out.

Another object of the invention is to provide a device for preventing stalk rot in banana and other fruit stalks, which can easily be attached to the stalk and which gives an effective protection therefor during transport and storage.

Still another object of this invention is to prevent stalk rot in banana and other fruit stalk by means of a substance capable of inhibiting stalk rot in gaseous or vaporized form, which substance due to the fact that it is gaseous will be dispersed throughout a space enclosing the section surface of the stalk end and thereby contact all portions of said section surface.

In accordance with this invention it has been discovered that the fungus which primarily gives rise to stalk rot in banana stalks is the fungus *Thielaviopsis paradoxa*. It has also been established by laboratory experiments that it is possible to arrest the growth of this fungus with the aid of substances brought into contact with the fungus in a gaseous state.

Accordingly, this invention contemplates arresting the growth of the fungus causing stalk rot in banana and other fruit stalks during transport and storage of the fruit by permitting a gas suitable for the purpose in question to act on the section surface and fungi and/or fungus spores there present. In order to confine the space intended to contain said gas it is possible for instance to provide around the stalk end and its section surface an enclosure, in which said gas is contained.

The introduction of the gaseous substance capable of inhibiting stalk rot into such a preferably cap-like enclosure can be accomplished in many ways. The most simple expedient is to attach to the enclosure before applying it to the stalk end, a substance which is present in solid or liquid state but is sufficiently vaporisable to provide a relatively high concentration of gas within the enclosure and which also acts to arrest or retard the growth of the fungus causing stalk rot when it contacts it in gaseous form.

Thus, the enclosure may advantageously be formed as a cap with an insert of a preferably porous material in which the substance inhibiting stalk rot is absorbed so that it may vaporize freely within the space confined by the enclosure and act on the wound surfaces of the stalk end. As an example of a suitable insert, filter paper may be mentioned, which may be impregnated with a solution of the substance inhibiting stalk rot, which substance on evaporation of the solvent remains in the filter paper in a subdivided state. The enclosure may conveniently consist of a sheet of regenerated cellulose (cellophane) or other plastic film, e.g. polyvinyl chloride, rubber hydrochloride, cellulose acetate, or of rubber or suitably treated paper, such as asphalt-coated paper or paraffin coated paper. Plastic films may suitably be joined to a sheet of metal foil, in particular aluminum foil, which gives the enclosure or cap a certain degree of stiffness and facilitates application thereof to the stalk end.

When manufacturing such a cap with insert it is suitable to proceed in the following manner. A strip of filter paper, having a width of e.g. about 9 cm. is passed through a bath comprising a solution of the substance inhibiting stalk rot. Thereupon the strip is passed through an evaporation chamber, in which the solvent is removed, and is then superimposed on a strip, consisting of a plastic foil combined with an aluminium foil having a width of e.g. about 25 cm. and is united with such strip on the plastic or aluminium face by means of a narrow ribbon of adhesive. From the resultant sheet-filter paper strip there are cut circular discs of a diameter of about 25 cm. which are then ready to be applied as caps on the stalk end of the banana bunch and affixed thereto e.g. by means of a rubber string or an adhesive tape.

A device of this type is illustrated in the accompanying drawing showing a strip 1 of filter paper containing a stalk-rot inhibiting substance, a plastic foil 2 and an aluminum foil backing 3. The dot-dash lines 4 indicate the discs that can be cut out of the composite strip.

Another means of attaching the substance inhibiting stalk rot to the enclosure material is to apply a layer of adhesive thereto and then apply the substance inhibiting stalk rot in powdered form on the adhesive so that it is bonded thereto. It is also possible to introduce a gaseous substance inhibiting stalk rot into a frangible ampulla which is secured to the enclosure material and is broken when the enclosure is applied to the stalk end.

Instead of proceeding as described above it is of course also possible to apply the substance inhibiting stalk rot e.g. by powdering the wound surfaces of the stalk end with the substance in a finely divided state and then affix an enclosure or cap over the stalk end, as described. Furthermore, it is possible first to affix the cap on the stalk end and then introduce the substance inhibiting stalk rot through an opening in the enclosure, which opening will then be sealed. The first-mentioned procedure, i.e. attaching the substance to the enclosure initially, is preferable from the point of view of easy operation.

The substance inhibiting stalk rot should have a sufficient vapor pressure to develop gas within the enclosure in such a concentration that the effect contemplated will be achieved. The amount of said substance will suitably be so chosen that said vapor pressure is maintained during the estimated period of transport and storage of the banana bunches, e.g. about a month. In practice it has been found that a relatively small amount of the substance, e.g. 0.2 to 0.5 g. for each enclosure is sufficient for said purpose. As an example of a suitable substance retarding stalk rot there may be mentioned 8-hydroxyquinoline which is readily soluble in acetone and may be taken up by a filter paper from a solution in acetone in the manner set forth above. The concentration of the solution will be adjusted so that the amount of quinoline compound in the paper will be within the limits indicated above. Other examples of substances which are active to inhibit stalk rot are tetrahydrophthalimide and Captan, i.e. N-trichloromethylmercapto-cyclohexane-1,2-dicarboximide, and further sulfur, iodine and diphenyl. A great number of other fungicidal substances are known and described in the literature and may be used in accordance with the present invention in so far as they exist in gaseous state at normal temperatures or exhibit a sufficient vapor pressure at normal temperatures and in so far as they retard the growth of the fungus causing stalk rot when contacted therewith in gaseous form.

The invention also includes banana and other fruit stalks treated with a substance inhibiting stalk rot in the gaseous state.

The invention is illustrated, but not limited by the following examples.

*Example 1*

In order to demonstrate the possibility of retarding the growth of *Thielaviopsis paradoxa* by means of substances present in the gaseous state the following laboratory experiment was made. A pure culture of the fungus was prepared from material taken from infected banana bunches. Malt agar was cast in a number of Petri dishes and was inoculated with material from the pure culture. In some of the dishes a filter paper pack containing the chemical to be tested was secured to the cover whereupon the dishes were placed upside down resting on the cover. Thus, the chemical did not contact the fungus or the agar but could only influence the fungus by gaseous action. As active chemicals, 8-hydroxyquinoline, tetrahydrophthalimide and Captan were used. In some of the dishes no chemical was introduced. After storage for a few days at room temperature, the dishes were examined. It was found that in the control dishes without chemical the fungus had grown considerably, while no growth at all of the fungus was observed in the dishes containing 8-hydroxyquinoline and captan and a retarded growth was observed in the dishes containing tetrahydrophthalimide.

*Example 2*

Circular filter papers of 9 cm. diameter were impregnated with an acetone solution of 8-hydroxyquinoline and the acetone was evaporated. Such an amount of the solution was used that 0.3 g. of the hydroxy quinoline remained on each paper. The filter papers were secured by means of adhesive to circular sheets of 25 cm. diameter consisting of aluminium foil laminated with cellophane film, the filter paper being secured to the cellophane side. The resulting sheets were attached to freshly cut banana bunches with the filter paper toward the section surface of the main stalk ends, the sheet material being folded up at the side of the stalk and secured with a rubber string. The treated banana bunches were loaded on a ship and transported to the place of destination, which required about three weeks. For control, there were included in the same shipment a number of banana bunches cut at the same time, some of which had been provided with an enclosure without chemical, some of which had been painted on their section surfaces with a conventional "protective paint" containing copper compounds and some of which were left completely untreated. On unloading the bunches, it was found that the banana bunches provided with an enclosure comprising 8-hydroxyquinoline were almost completely free from main-stalk rot and in the few cases where stalk-rot was found, the rot had entered through injuries on the main stalk between the cuts, while in no case there appeared any stalk-rot which had started from the section surfaces. The bunches provided only with enclosure were infected to about 25%, those treated with "protective paint" to about 40% and the untreated bunches to about 90%.

While the invention has been described above with reference to banana bunches, it may also be carried into practice in a similar manner in connection with other stalk fruits, such as e.g. pineapple.

I claim:

1. A method of preventing stalk rot in a fruit stalk which comprises enclosing a stalk end in a composite cap-forming wrapper comprising a gas impervious enclosure sheet and an interior carrier material on one side thereof, said carrier material having absorbed thereon a fungicide that is vaporizable under ambient conditions and active in the form of a gas, whereby fungicidal gas is vaporized from the carrier material into an enclosure formed between the enclosure sheet and the stalk end.

2. A method of preventing stalk rot in a fruit stalk which comprises enclosing a stalk end in a composite cap-forming wrapper comprising a gas impervious enclosure sheet, an exterior backing sheet of a relatively stiff material joined to one side of the enclosure sheet and an interior carrier material on the other side of the enclosure sheet, said carrier material having absorbed thereon a fungicide that is vaporizable under ambient conditions and active in the form of a gas, whereby fungicidal gas is vaporized from the carrier material into an enclosure formed between the enclosure sheet and the stalk end.

3. A method of preventing stalk rot in a fruit stalk which comprises enclosing a stalk end in a composite cap-forming wrapper comprising a gas impervious cellophane enclosure sheet, an exterior backing sheet of metal foil joined to one side of the cellophane sheet and filter paper on the other side of the cellophane sheet, the filter paper having absorbed thereon from 0.2 to 0.5 gram of a fungicide that is vaporized under ambient conditions and active in the form of a gas, whereby fungicidal gas is vaporized from the filter paper into an enclosure formed between the cellophane sheet and the stalk end.

4. In combination, a fruit stalk having a cut end and a gas impervious wrapper for inhibiting stalk rot forming an enclosure over said cut end, said wrapper having marginal portions applied around the cut stalk end and a central portion spaced from the cut end for forming a substantially gas-tight enclosure over the cut end, and a carrier material on the enclosure sheet within the enclosure, said carrier material having absorbed thereon a fungicide vaporizable under ambient conditions and active in the form of a gas.

References Cited in the file of this patent

UNITED STATES PATENTS

| | | |
|---|---|---|
| 2,265,522 | Farkas | Dec. 9, 1941 |
| 2,336,291 | Phillips | Dec. 7, 1943 |
| 2,406,990 | Borden | Sept. 3, 1946 |
| 2,413,129 | Wilson | Dec. 24, 1946 |
| 2,480,010 | Flett | Aug. 23, 1949 |

FOREIGN PATENTS

| | | |
|---|---|---|
| 517,079 | Great Britain | Jan. 19, 1940 |
| 103,902 | Australia | May 19, 1938 |